UNITED STATES PATENT OFFICE.

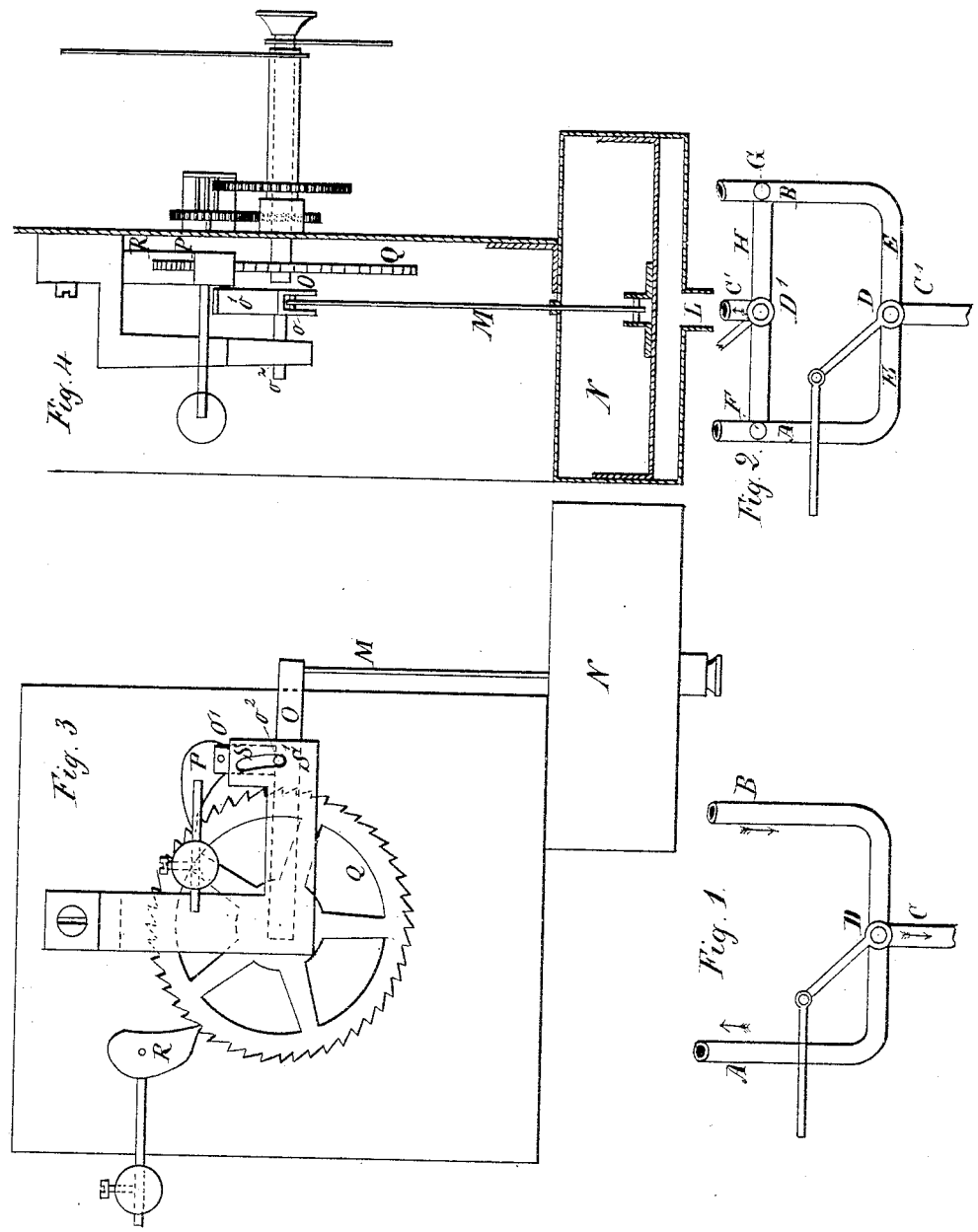

CHARLES ALBERT MAŸRHOFER, OF VIENNA, AUSTRIA, ASSIGNOR TO
VICTOR POPP AND ERNEST RESCH, OF SAME PLACE.

IMPROVEMENT IN PNEUMATIC CLOCKS.

Specification forming part of Letters Patent No. 215,381, dated May 13, 1879; application filed June 1, 1877; patented in England, February 7, 1877; in France, February 10, 1877; in Belgium, February 28, 1877.

*To all whom it may concern:*

Be it known that I, CHARLES ALBERT MAŸRHOFER, of Vienna, in the Empire of Austria, have invented certain new and useful Improvements in Clocks, and for which I have obtained Letters Patent in Great Britain dated February 7, 1877, in France dated February 10, 1877, and in Belgium dated February 28, 1877, of which the following is a specification.

The object of this invention is to keep a number of clocks in regular and isochronous motion by pneumatic power.

According to this invention pipes are led from one central point to all the clocks, and the works of these clocks are kept in isochronous motion by alternately conducting compressed air into these pipes and then allowing it to escape. The connection of the pipes with the reservoir containing compressed air and with the atmosphere is effected by a three-way cock, which is opened and closed at regular intervals by automatic means or by hand. It is preferred to make the arrangement so that the communication of the clocks with the compressed-air reservoir is effected every minute.

The accompanying drawings illustrate a suitable mode of carrying out this invention.

Figure 1 illustrates one arrangement of pipes; Fig. 2, another. Fig. 3 is a view of the works of one of the clocks from behind, and Fig. 4 from the side.

In Fig. 1, A is the pipe leading to the clocks. B is the pipe leading to a reservoir containing compressed air. C is the exhaust-pipe. D is a three-way cock, moved at regular intervals by any automatic mechanism. It will be evident that the cock may be set either so that B will communicate with A, in which case the compressed air will fill the pipes, or that A will communicate with C, in which case the compressed air will escape from the pipes.

Fig. 2 illustrates an arrangement to be used in case the automatic apparatus for opening and shutting the three-way cock D should be out of order. F and G are three-way cocks, which may be set so as to close the communication of the pipes A and B with the pipe E and open it to the pipe H H. D' is a three-way cock, to be worked by hand. C' is an exhaust-pipe.

In Figs. 3 and 4 are shown suitable modes of working a clock by pneumatic power. The pipe L is in communication with the pipe A. (Shown in Figs. 1 and 2.) When compressed air is present in the pipe L the piston N is raised, and the piston-rod M, acting on the lever O, moves the pawl P, thus pushing the ratchet minute-wheel Q the distance of one tooth.

S' is a bracket-arm mounted upon the clock-frame, and is provided with a segmental slot, S, the center of the arc described by this slot being that of the axis of the ratchet-wheel Q. To this arm S' is pivoted a lever, O, the outer end of which is forked, and upon a pin, $o$, in the forked end of the lever is hung the piston-rod M. The lever O is further provided with a vertical arm, $o^1$, carrying the pawl P at its upper extremity, and a stud or pin, $o^2$, at or near its lower extremity to engage the slot S and limit the throw of the actuating-pawl P in its movements either way.

It will be readily understood that some means had to be devised to counteract the variable pressure of the compressed air within the conduits when alternately admitted to and exhausted from said conduits by the prime motor or standard clock. This variation in pressure may result from various causes, either from compression, variations in the reservoir, or from thermometric or barometric changes, which variations directly affect the movements of the actuating-pawl P through the piston or equivalent device; and it will be readily understood that when this pressure is but slightly in excess of that required to move the pawl P a given distance, such movement would necessarily be correspondingly greater than that required, and the clock-movement so actuated could not record isochronous time. I have found this arrangement very effective, and at the same time very simple.

R is a stop-pawl to prevent the retrograde movement of the ratchet-wheel Q, the two pawls as arranged forming an escapement. Each one of the pawls is provided with an adjustable counter-weight, R' P', which slides upon bars *r p*, rigidly mounted upon the pawls, said counter-weights being secured in position by means of the set-screws *r' p'*, respectively, and these counter-weights serve the purpose of holding the pawls in the teeth of the ratchet-wheel and to regulate the force with which said pawls engage the ratchets.

Without departing from the substance of this invention, a float swimming in mercury or a movable diaphragm may be used instead of a piston.

From what has been said above it will be seen that the time-movements of a standard clock are transmitted to one or more distant clocks through the medium of the pulsations of compressed air automatically and alternately admitted to and exhausted from the conveying-tubes by the said standard clock, and made to actuate a piston, diaphragm, or equivalent device connected with the time mechanism of said distant clock or clocks, each admission and each exhaust causing a positive movement and a negative movement alternately in the actuating mechanism of the distant time-pieces—that is to say, each admission of a current of compressed air will cause the ratchet-wheels Q of the distant clocks to be moved a given distance forward, while each exhaust of the air will cause the actuating-pawl P to move or ride upon said ratchet-wheel a suitable distance backward, ready to engage the next tooth, and in part a positive movement to the ratchet-wheel at the next admission of a current of compressed air; and it is this automatic and alternate admission and exhaustion of compressed air which so essentially differs from the means heretofore adopted to transmit time-movements to a distance, and whereby isochronous time may be readily established between a series of clocks without complicating their respective mechanisms, and regardless of the changes in pressure or atmosphere.

I claim—

1. Transmitting time-movements to a distance by means of the pulsations of a current of compressed air alternately admitted to and exhausted from the conveying-tubes by one time mechanism, each pulsation acting upon a piston or pistons or equivalent means to reproduce isochronous time-movements in one or more distant time mechanisms, substantially as described, for the purpose specified.

2. In transmitting time-movements to a distance by means of the pulsations of a current of compressed air alternately admitted to and exhausted from the conveying-tubes, counteracting the variable pressure of the compressed air, either from barometric, thermometric, or compression variations, by limiting the throw of the actuating pawl or pawls of the distant time movement or movements, substantially as described.

3. In mechanism for reproducing isochronous time-movements transmitted thereto from a distance by means of the pulsations of a current of compressed air acting upon a piston or its equivalent, the combination, with a ratchet-wheel, of an actuating-pawl having a limited throw to limit the revolution of the ratchet-wheel, a stop-pawl to prevent the retrograde motion of said ratchet-wheel, and suitable means to prevent the displacement of said pawls when engaging the ratchet-wheel, substantially as described.

4. The combination, with the ratchet-wheel Q and pawl P, the arm O, provided with a stop-pin, rod M, and piston N, or its equivalent, of a bracket-arm, substantially as shown and described, provided with a segmental slot, S, the center of the arc described by said slot being that of the axis of the ratchet-wheel, substantially as described, for the purpose specified.

5. The combination, with the ratchet-wheel Q, of the pawls P R, each provided with an adjustable counter-weight, substantially as shown and described, for the purpose specified.

6. In an arrangement for working clocks by means of compressed air, the combination of air-pipes A and B, exhaust-pipes C, and three-way cocks D', F, and G.

7. In mechanism for reproducing isochronous time-movements transmitted thereto from a distance by means substantially as set forth, a piston or its equivalent, an actuating-pawl having a limited throw, and a stop-pawl, both pawls being provided with adjustable counterbalancing-weights, and arranged to form an escapement, a ratchet-wheel, a minute-hand, and the usual gearing and hour-hand, all constructed, combined, and operating substantially as described, for the purpose specified.

8. In a mechanism for transmitting time-movements to a distance, the combination, with a time mechanism, or mechanisms constructed substantially as described, of a prime motor, consisting of a compressed-air reservoir and suitable connecting-pipes (between said reservoir and distant time mechanism) and an exhaust-pipe, each provided with suitable stop-cocks, and a clock-movement connected with and alternately actuating said stop-cocks (of the conveying and exhaust pipes) to transmit to the actuating-pawl of said distant time mechanism a positive movement at each pulsation of the compressed air and a corresponding negative movement at each exhaust of the air, substantially as set forth.

In witness that I claim the foregoing I have hereunto set my hand this 28th day of March, 1877.

C. A. MAŸRHOFER.

Witnesses:
ERNST RENE,
WILLIAM HINING.